United States Patent [19]
Fanshier

[11] Patent Number: 5,841,972
[45] Date of Patent: Nov. 24, 1998

[54] SYSTEM USING DISPLAYED CONFIGURATION UTILITY ON MONITOR INCLUDING LIST OF TARGET NODES, FOR ADMINISTERING INTERCONNECTED NODES OF COMPUTER NETWORK

[75] Inventor: Stephen R. Fanshier, San Diego, Calif.

[73] Assignee: NCR Corporation, Dayton, Ohio

[21] Appl. No.: 778,495

[22] Filed: Jan. 3, 1997

[51] Int. Cl.⁶ .................................................. G06F 13/00
[52] U.S. Cl. ......................................................... 395/200.5
[58] Field of Search ............................. 395/200.53, 200.5

[56] References Cited

U.S. PATENT DOCUMENTS

5,452,415 9/1995 Hotka ................................... 395/200.5
5,627,969 5/1997 Kobayashi et al. ................... 395/200.5

*Primary Examiner*—Krisna Lim
*Attorney, Agent, or Firm*—Merchant, Gould, Smith, Edell, Welter & Schmidt

[57] ABSTRACT

A configuration utility for administering a computer network of interconnected nodes. The configuration utility is displayed on a monitor attached to a computer connected to the network, wherein the displayed configuration utility includes a list of one or more target nodes in the network. Data is received into the displayed configuration utility for selecting one or more of the target nodes in the network and for specifying one or more configurable elements on the selected target nodes. The specified configurable elements are then modified on the selected target nodes in accordance with the received data.

36 Claims, 7 Drawing Sheets

SYSTEM USING DISPLAYED CONFIGURATION UTILITY ON MONITOR INCLUDING LIST OF TARGET NODES, FOR ADMINISTERING INTERCONNECTED NODES OF COMPUTER NETWORK

BACKGROUND OF THE INVENTION

1. Field of the Invention

This invention relates in general to computer networks, and in particular to systems administration in computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for system management tools capable of operating in this environment.

What is needed is a configuration utility for configuring service processes from a single location since networks can get quite large, incorrect tuning of the services is minimized, and consistency across the network is promoted. Existing general purpose utilities such as the Microsoft™ Registry Editor are error prone and do not have the ability to configure multiple computers simultaneously.

SUMMARY OF THE INVENTION

The present invention discloses a method, apparatus, and article of manufacture for systems administration for a computer network. The present invention provides a configuration utility that performs the steps of receiving a service process selection, receiving a service process configuration change, receiving a target node selection, wherein the service process runs on target nodes, and applying the configuration change to the service process. The target node entries and the service process entries in the network registry are updated. In the preferred embodiment, the service process can be an interprocess communications queue (IPCQ) service, a network agent manager service, or an administration service.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
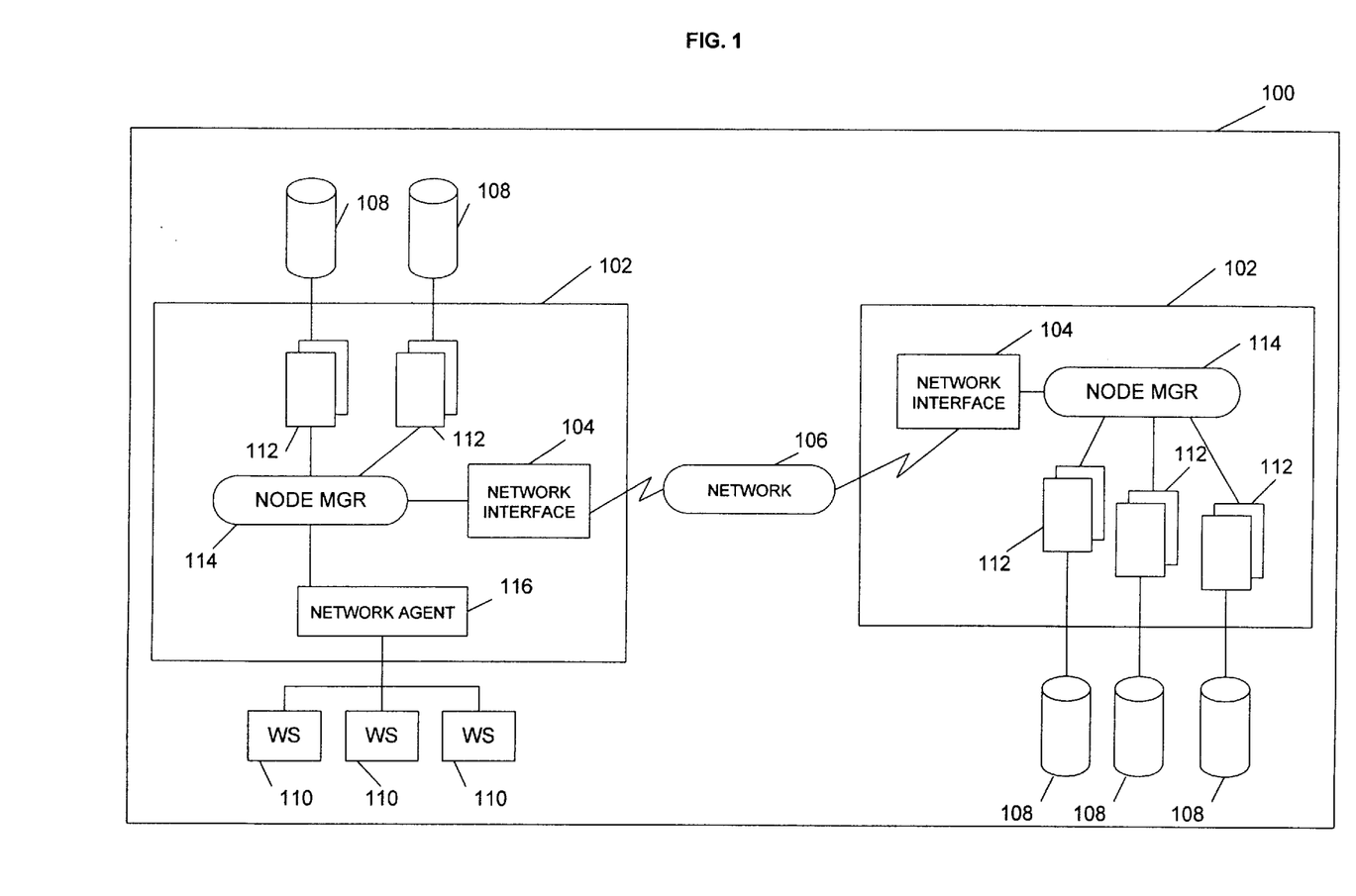
FIG. 1 is an exemplary illustration of a distributed computing environment known as a TOP END™ system.

FIG. 1 is an exemplary illustration of a distributed computing environment 100, known as a TOP END™ system. The present invention comprises a method, apparatus, and article of manufacture for systems administration in such distributed computing environments.

A TOP END™ system 100 is comprised of one or more nodes 102 interconnected through a network interface 104 by a network 106, wherein each of the nodes 102 is comprised of one or more computers. Each of the nodes 102 is typically coupled to one or more fixed and/or removable data storage units (DSUs) 108, such as disk drives, that store one or more databases.

In the exemplary environment of FIG. 1, a client-server architecture is disclosed. At least one of the nodes 102 provide the connection to client systems operating on workstations 110. Operators of the TOP END™ system 100 use a workstation 110 or terminal to transmit electrical signals to and from server systems operating on the node 102 in the TOP END™ system 100, wherein the electrical signals represent commands for performing various functions in the TOP END™ system 100, such as search and retrieval functions against the databases. Those skilled in the art will recognize, however, that the present invention has application to any function or software that can be performed by a TOP END™ system 100.

According to the present invention, these functions are divided into several modular components 112 that are designed for a distributed, message-passing computing environment. In TOP END™ terminology, a "component" 112 is a process or logical group of processes that performs one or more functions. The components 112 work together to process distributed transactions initiated by the client systems.

Work is divided among the nodes 102 in the TOP END™ system 100 by spreading the location of these modular components across the nodes 102. Thus, each node 102 performs some localized function and work is managed by the system 100 so that a sequence of multiple functions comprising a client request is performed by one or more of the modular components on one or more of the nodes 102 in the system 100.

The fundamental component 112 in a TOP END™ system 100 is the application component 112. Application components 112 are used to create and grow distributed TOP END™ systems 100. The application components 112 could be user-written, provided as a solution by an independent vendor, or supplied as part of the TOP END™ system 100. In a TOP END™ system 100, a comprehensive set of services and libraries are available to an application component 112, including resource managers such as database management systems (DBMS), transaction managers, and communications managers.

Another component of a TOP END™ system 100 is the node manager 114. The node manager 114 is a collection of processes that offer core services to coordinate processing among nodes 102. These processes, in general, work independently of each other. Services provided by the node manager 114 include transaction management (for example, commit coordination), logging, failure recovery, client/server request handling, security management, runtime administration, and application component 112 control.

Still another component of a TOP END™ system 100 is the network agents 116. Network agents 116 are used to allow transactions and service requests to enter a TOP END™ system 100 from an application component 112 or networked workstation 110 that does not have a node manager 114 on it.

The TOP END™ system 100 also provides myriad tools for managing the distributed computing environment. More specifically, a TOP END™ system 100 provides a full range of graphical, menu-based administrative tools that make it easy to manage distributed computing environments. The systems administration tools are used to perform component start-up and shutdown, manage auditing and recovery, activate communication links, perform automatic software distribution, and so on.

Configuration Application

The present invention provides a configuration application program to allow TOP END™ administrators to modify configurable parameters and configuration information on multiple TOP END™ server nodes 102. The configuration application provides a graphical interface using the Windows GUI style. In the exemplary embodiment presented herein, the primary motivation of the configuration application according to this invention is to modify TOP END™ data on a Windows NT system. The data is stored in the Windows NT registry structure and, as such, can be accessed from other computers in the network. The configuration application allows the administrator to build up a list of target TOP END™ nodes on the network and simultaneously apply configuration changes to the TOP END™ service processes running on those machines. The administrator need not be physically located at any of the machines being targeted.

Figure 2:
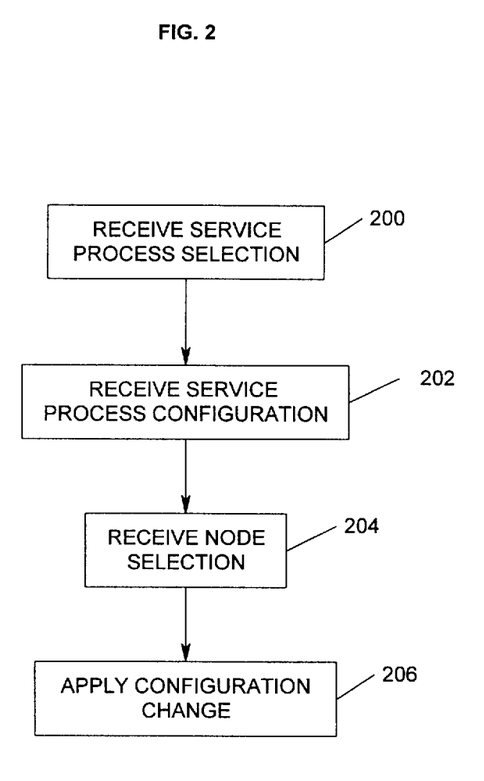
FIG. 2 is a block diagram illustrating the steps performed by the configuration application according to the present invention.

FIG. 2 is a block diagram illustrating the operation of configuration application according to the present invention.

Block 200 represents the configuration application receiving the service process selection from the TOP END™ administrator.

Block 202 represents the configuration application receiving the service process configuration from the TOP END™ administrator.

Block 204 represents the configuration application receiving the node selection from the TOP END™ administrator.

Block 206 represents the configuration application applying the configuration change to the registry.

The configuration application according to the present invent provides for remote and local node configuration. Additionally, multiple nodes may be selected at once thereby allowing multiple nodes to be updated in a single session.

In the exemplary embodiment, the configuration application according to the present invention is internationalized such that all labels and text messages and locale formats (e.g., dates, times, and sorting orders) are displayed in the locale of the user. Input is restricted to single byte character sets.

The data being modified or created by the configuration application is contained in the TOP END™ registry subkeys defined on TOP END™ server nodes 102. The TOP END™ registry may be stored on the DSUs 108. The TOP END™ registry stores the configuration information for the operating system, including equipment settings, software configurations, network setup, and the dynamic link libraries (DLLs) needed to run applications.

The TOP END™ registry has two types of entries, keys and values. Keys are similar to topics for organizing the registry information. Subkeys provide more detail about a particular topic. Values are the information that describes the key or subkey.

The subkeys are all protected such that modification is restricted to members of the following local groups on the server: topend and Administrators. TOP END™ Registry subkeys are never created or deleted by the configuration application. It only affects value entries within the subkeys.

When TOP END™ registry subkey errors are detected by the configuration application, an error is reported. The user must use the base setup utility to repair any registry problems.

In the preferred embodiment of the invention, the TOP END™ system 100 services and libraries include an IPCQ Service for handling inter-process communications and process monitoring for TOP END™ applications, a NAM Service for starting TOP END™ network agents 116 for incoming connections from TOP END™ remote client applications, and an Administration Service for handling network connections for global administration sessions.

In the IPCQ Service, the configuration application according to this invention modifies the configuration parameters for the Number of worker threads, Read Buffer Size, IPCQ Debug Level, and the Sysmon Debug Level.

In the NAM Service, the configuration application according to this invention modifies the configuration parameters for the TCP/IP Connection script and service port names, Named Pipe connection script and identifiers, and the NAM Debug Level.

In the Administration Service, the configuration application according to this invention modifies the configuration parameters for the Global administration service port address.

Figure 3:
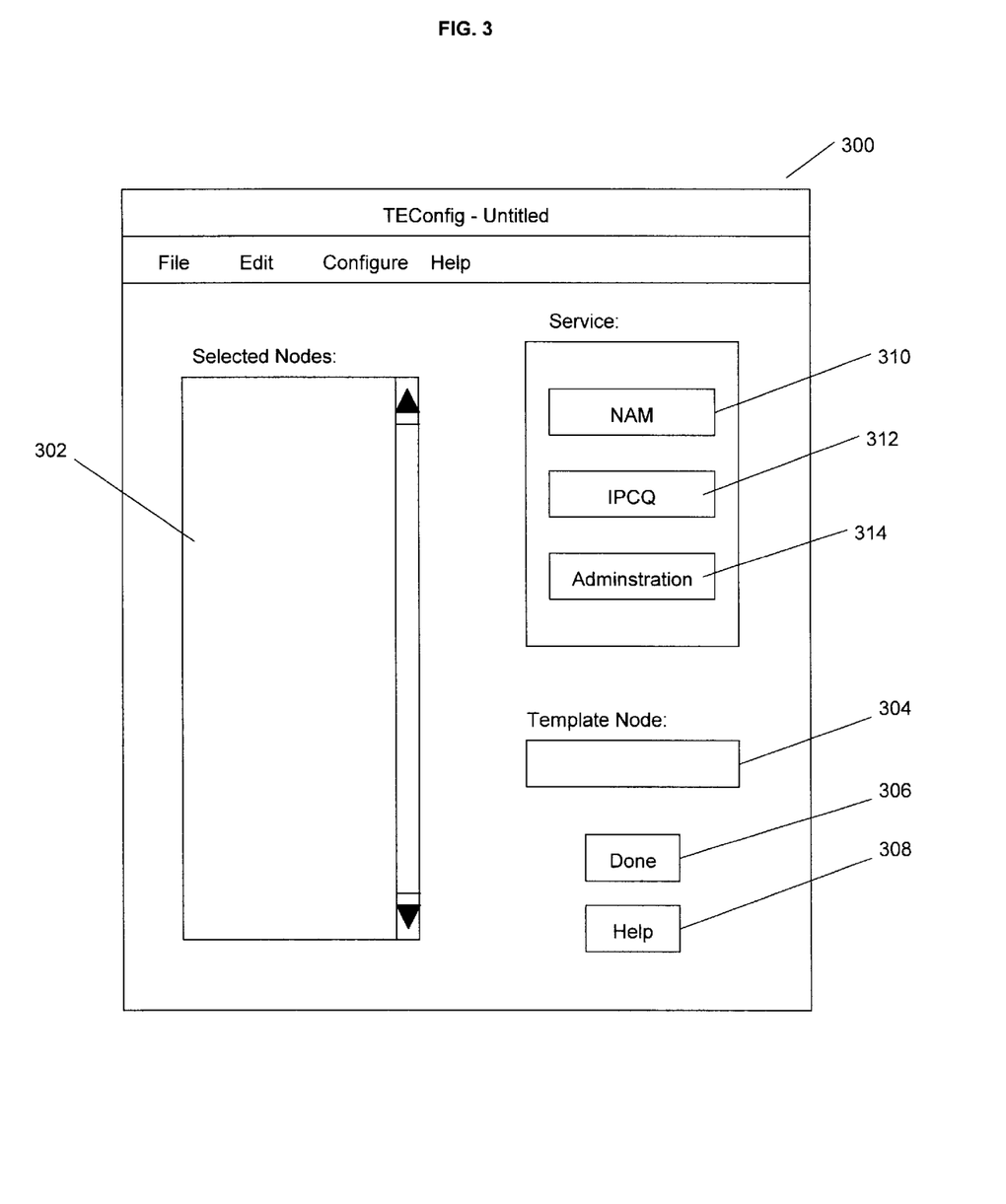
FIG. 3 is a block diagram illustrating an exemplary main window displayed on a monitor according to the present invention.

FIG. 3 is a block diagram illustrating an exemplary main window 300 displayed on a monitor according to the present invention.

The primary purpose of the main window 300 is to specify target TOP END™ nodes 102 and then configure one or more of the three TOP END™ services installed on the targeted nodes 102.

The large text area labeled nodes displays an editable node list 302. To enter nodes in the node list 302, the user can either position the cursor in the text area and type names of TOP END™ nodes 102, delimiting each with a newline, open a file containing a list of nodes, or cut and paste the list from another application.

Once the user is satisfied with the node list 302, one of the service buttons can be selected. Each of these involves a dialog, described below, which specifies the changes to be made to the targeted nodes.

The template area 304 is used to identify a node which already contains services configuration values. If there is only one node in the node list 302, it is automatically placed in the Template area 304. The template node need not be one of the targeted nodes. The purpose of the template node is to initialize the service dialogs with "good" values; ones which match or are very close to the desired values to be sent to the targeted nodes.

The done button 306 terminates the application. The help button 308 invokes help for this window.

The NAM button 310 opens dialog for configuring the NAM services on targeted nodes. The IPCQ button 312 opens a dialog for configuring the IPCQ services on targeted nodes. The Administration button 314 opens dialog for configuring the Global Administration Agent services on targeted nodes.

When the IPCQ button 312 is selected from the main window 300, the user can specify changes to the IPCQ service on the targeted nodes specified in the main window 300.

Figure 4:
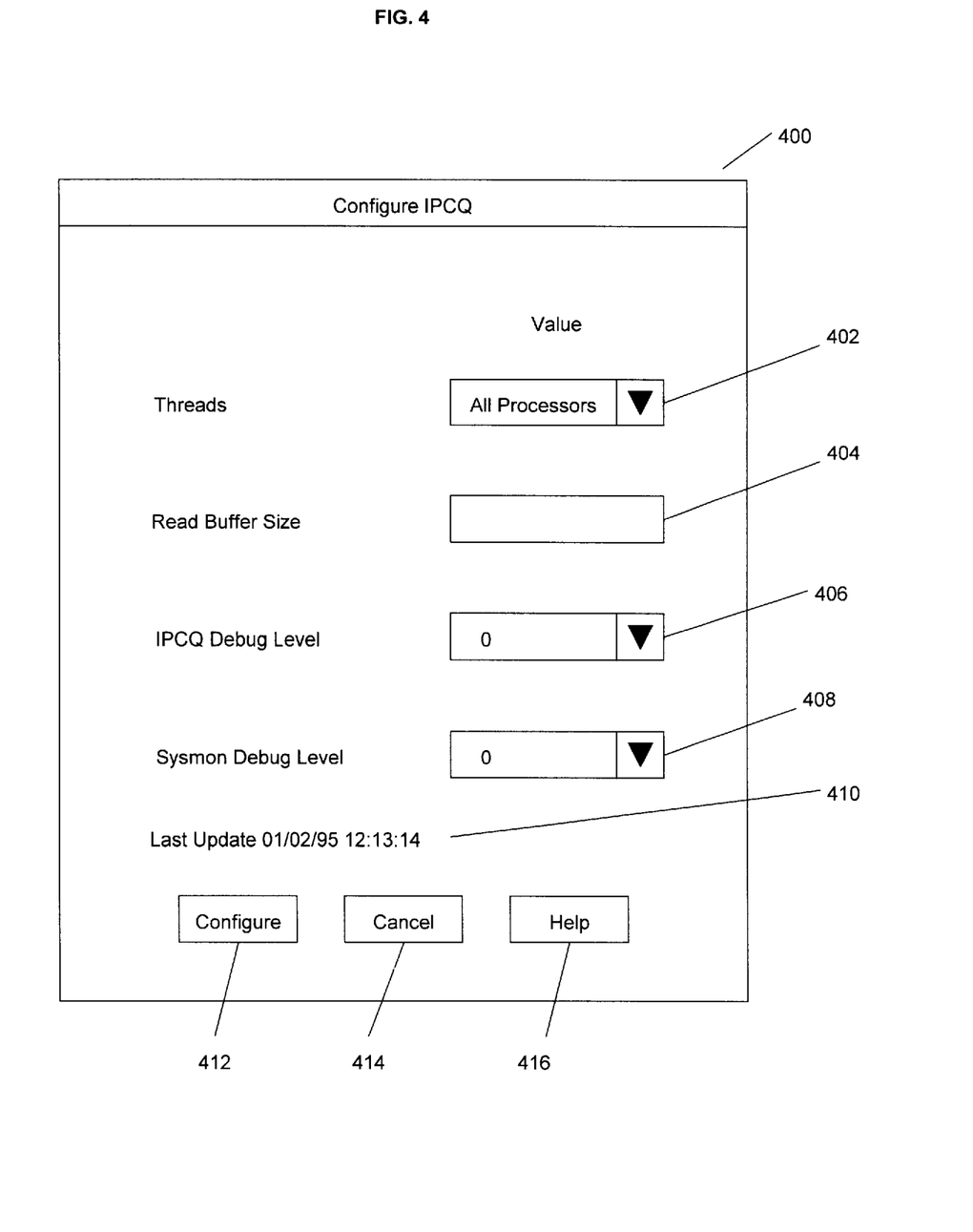
FIG. 4 is a block diagram illustrating an exemplary configure IPCQ window displayed on a monitor according to the present invention.

FIG. 4 is a block diagram illustrating an exemplary configure IPCQ window 400 displayed on a monitor according to the present invention.

The configure IPCQ window 400 specifies changes to current configuration values. The values are initialized to current values on the template node identified in the main window 300.

The threads value area 402 specifies the number of worker threads. The allowable range is 1–32 or All Processors. All Processors results in a thread being created for each processor in a multi-processor configuration.

The Read Buffer Size value area 404 specifies the IPCQ buffer size for reading from IPCQ pipe plus a fixed amount for headers. Messages larger than this will require multiple reads. A larger value than necessary ties up more IPCQ service local memory than necessary and could impact the number of connections the service can maintain.

The IPCQ Debug Level value area 406 specifies a variable ranging from 0 (no debugging) to 8 (full debugging).

The Sysmon Debug Level value area 408 specifies a variable ranging from 0 (no debugging) to 8 (full debugging).

The Last Update 410 indicates the date and time of the last IPCQ configuration change for the template node.

The Configure button 412 initiates the updates to the targeted nodes. When the updates have completed the user is returned to the main configuration menu. The Configure button button 412 is disabled until valid input is entered in one of the Value text areas.

The Cancel button 414 exits this dialog with no updates being made. The Help button 416 invokes help for his dialog box.

Figure 5:
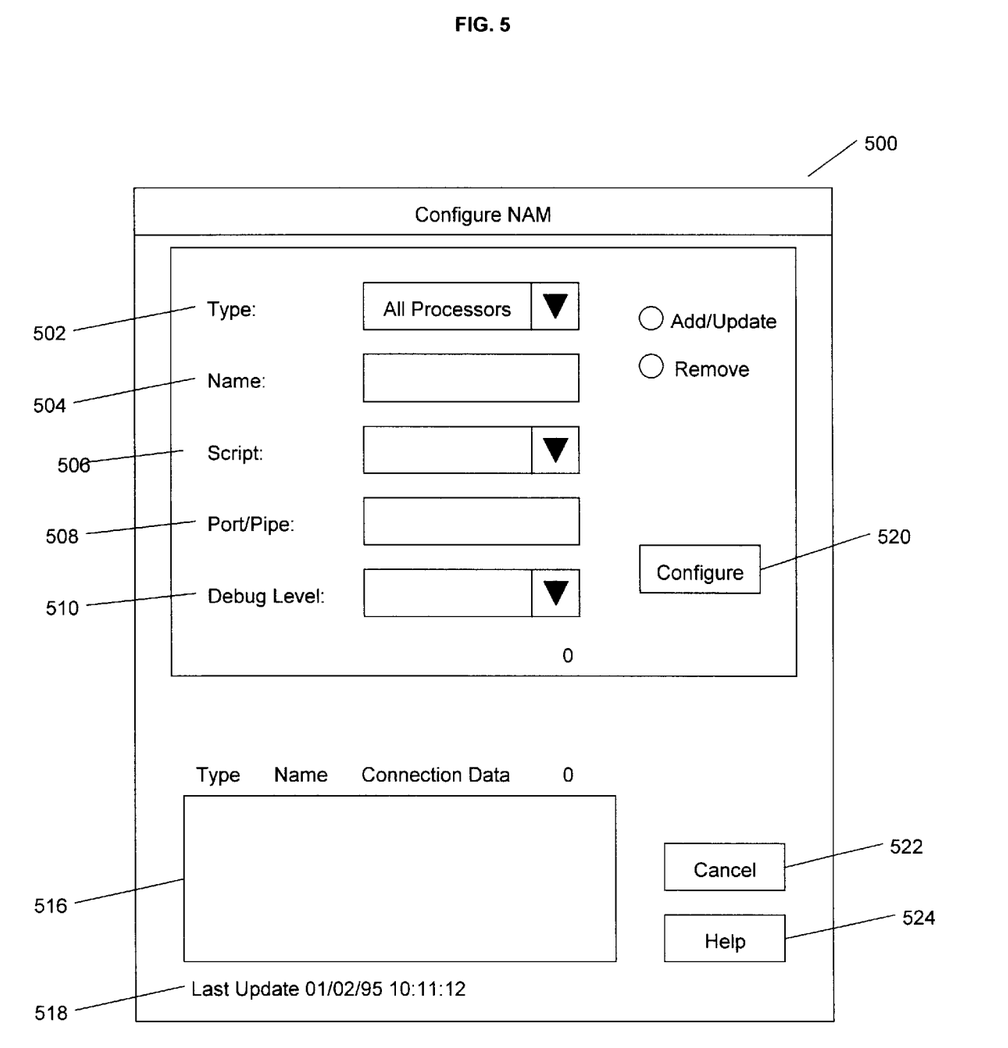
FIG. 5 is a block diagram illustrating an exemplary NAM configuration dialog displayed on a monitor according to the present invention.

FIG. 5 is a block diagram illustrating an exemplary NAM configuration dialog displayed on a monitor according to the present invention. When the NAM button 310 is selected from the Main Window 300, the user can modify NAM connection information on the nodes specified in the Main Window 300 with the NAM Configure Dialog 500.

The Type value 502 specifies the type of connection being configured. Possible values are TCP/IP and Named Pipes. Specifying a type clears the Name, Script and Port/Pipe text areas.

The Name value 504 uniquely identifies the connection to the NAM service.

The Script value 506 displays the name of an NA command script file.

The Port/Pipe value 508 identifies the port names and numbers. If the Type value 502 is TCP/IP then the Port/Pipe value 508 has a semicolon separated list of service port names or numbers. If a number is specified then it must be greater than 1024. If a service name is provided then it needs to match an entry in the TCP/IP service database. If the Type value 502 is Named Pipe then enter one or more pipe names separated by a semicolon.

The debug level 510 indicates the debug level for the AM service.

The Add/Update button 512 indicates the connection data is information to be added or modified on the target node(s). The Remove button 514 indicates the connection data is information to be removed from the target node(s).

Type Name Connection Data list box 516 indicates a list of existing connection information on the template node. Type is TCP/IP or Named Pipe, Name is the entry's name and Connection Data is the command script followed by one or more port/pipe names. Selecting an entry in the list box 526 copies the relevant values into the Connection Data group controls above. Only one entry may be selected at a time.

The Last Update text 518 indicates the date and time of the last NAM configuration change for the template node.

The Configure button 520 initiates configuration on target node(s). The Cancel button 522 exits the configure NAM dialog 500 with no changes. The Help button 524 invokes help on the configure NAM dialog 500.

Figure 6:
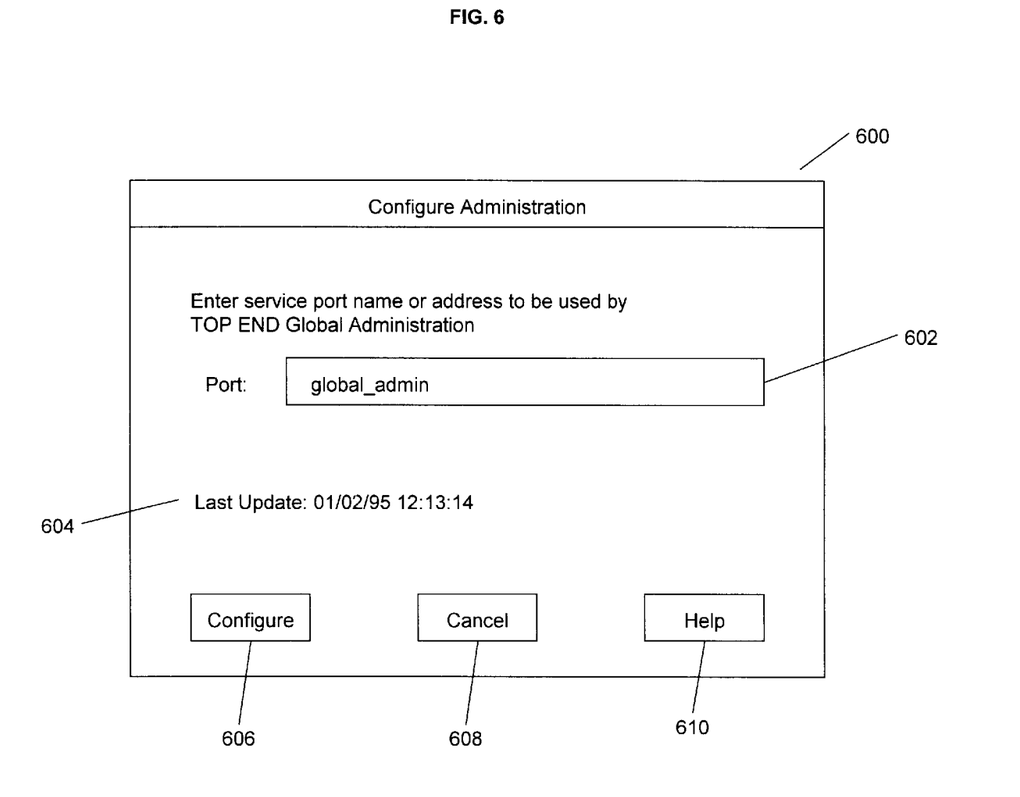
FIG. 6 is a block diagram illustrating an exemplary Administration configuration dialog displayed on a monitor according to the present invention.

FIG. 6 is a block diagram illustrating an exemplary Administration configuration dialog displayed on a monitor according to the present invention. When the Administration button 314 is selected from the Main Window 300, the user can modify Administration connection information on the nodes specified in the Main Window 300 with the Administration Configure Dialog 600.

The Administration Configure Dialog 600 allows the administrator to modify the port name or address used by the Global Administration Agent service on the nodes specified in the main configuration dialog.

The Port value 602 initially displays the current service port name or address in the template TOP END™ registry subkey value entry, Services\Administration\tp_crsc\ PortAddress. By default, this is,."global_admin": The Global Administration Agent service uses this value to listen for incoming connect requests from TOP END™ global administration sessions.

If a service name is provided then it needs to match an entry in the TCP/IP service database. If a service port address is provided then the value is used directly by the TOP END™ Comm library to establish connections. When the updates have completed the user is returned to the main window 300.

The Last Update text 604 indicates the date and time of the last IPCQ configuration change for the template node.

The Configure button 606 initiates configuration on target node(s). The Cancel button 608 exits the Administration Configure Dialog 600 with no changes. The Help button 610 invokes help on the Administration Configure Dialog 600.

In an exemplary embodiment according to the present invention, selecting "Configure" from the NAM, IPCQ or Administration dialogs 310, 312, or 314 initiates the configuration on the targeted nodes. For each target node, the configuration application will connect to the node's registry and update it. After updating all values on a specific node, it will then update the ConfigStatus registry entries for each affected service.

Figure 7:
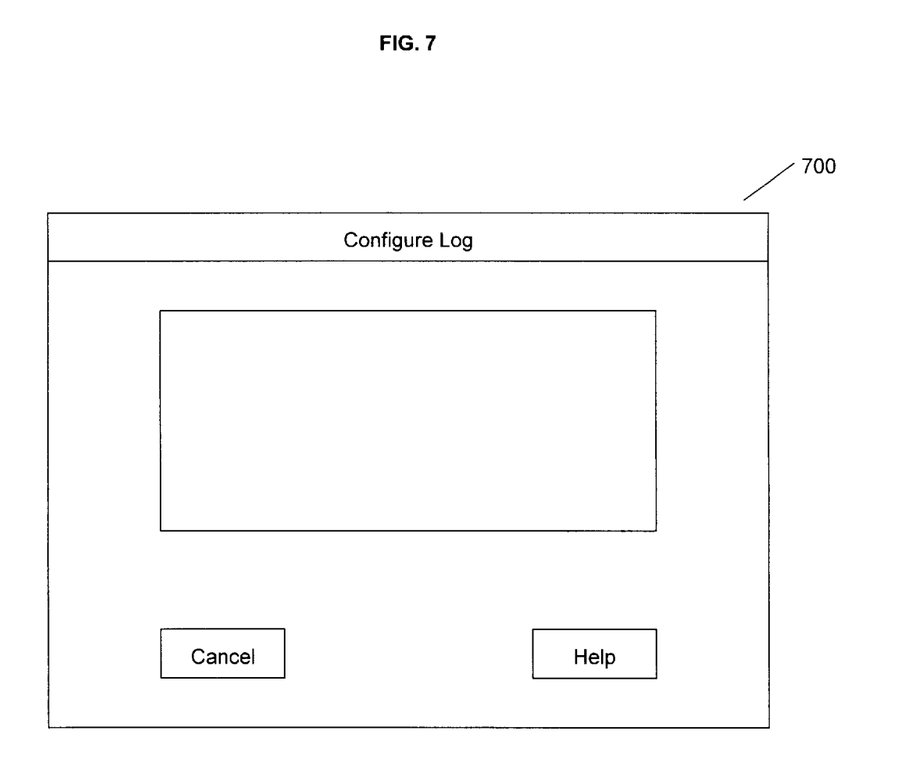
FIG. 7 is a block diagram illustrating an exemplary configuration log dialog displayed on a monitor according to the present invention.

FIG. 7 is a block diagram illustrating an exemplary configuration log dialog displayed on a monitor according to the present invention. The configuration log dialog 700 is a scrollable listbox displaying all modification attempts. If changes were requested but are the same as current values then no update is made and a message is logged accordingly. The configuration log dialog displays messages in the form: <MsgId> <timestamp> <user name> <target node name>: "Message", "Message information," where <MsgId> is a message number, <timestamp> gives the date and time the update occurred, <user name> is the current user account name, <target node name> is the name of target node, "Message" is either "Update successful" or "Update failed", and "Message information" provides additional information including value being updated and reasons for failure.

The configuration application uses interfaces defined within the TOP END™ utility library to implement interfaces to the NT operating system. In particular, the following functionality is required:

The TP_GETREGISTRYVALUE function reads binary DWORD registry data. The TP_GETREGISTRYSTRING function reads string registry data. The TP_CREATEREGISTRYSUBKEY function creates new subkeys. The TP_DELETEREGISTRYSUBKEY function removes subkeys. The Tp_Getopt function parses command line arguments. The TP_GETREGISTRYSUBKEYS function gets a list of subkeys. The TP_MODIFYREGISTRYSUBKEYS function modifies security descriptor associated with a subkey. The TP_NTERRORSTRING function gets a text version of Win32 error codes. The TP_SETREGISTRYSTRING function sets string values in registry. The TP_SETREGISTRYVALUE function sets binary DWORD value in registry. The TP_SETREGISTRYBINARYVALUE function sets the binary value of arbitrary size in registry. The TP_GETREGISTRYBINARYVALUE function reads binary registry data.

The time stamps values presented in the dialog boxes are converted from the *ConfigStatus registry value entries. These are SYSTEMTIME data structures returned from a call to GETSYSTEMTIME. This is a time relative to UTC. The Win32 API, SYSTEMTIMETOTZSPECIFICLOCALTIME, can be used to convert this to the local time zone. GETDATEFORMAT and GETTIMEFORMAT can be used to convert a SYSTEMTIME structure into a readable format. To ensure locale specific formats the LOCALE_NOUSEROVERRIDE flag should be specified in the GETDATEFORMAT and GETTIMEFORMAT calls.

After applying the requested changes to the targeted registry entries, the configuration application must then write a new timestamp to the relevant ConfigStatus registry entry. These would be IPCQConfigStatus, NAMConfigStatus and AdminConfigStatus. The new data would be the current system time obtained from the GETSYSTEMTIME() API.

If the configuration application ever encounters a missing subkey it reports the error to the log but does not attempt to repair the registry. The following lists the registry value and its respective Subkey\Value Entry to affect based on user input:

| | |
|---|---|
| IPCQ Threads | Services\IPCQ\Threads |
| IPCQ Buffer Size | Services\IPCQ\ReadMsgSize |
| IPCQ Debug Level | Services\IPCQ\IPCQDebugLevel |
| IPCQ Sysmon Debug Level | Services\IPCQ\SysmonDebugLevel |
| IPCQ Update Timestamp | Services\IPCQ\IPCQConfigStatus |
| NAM TCP/IP values | Services\NAM\TCP/IP\name |
| NAM Named Pipe Values | Services\NAM\TCP/IP\NamedPipes\name |
| NAM Debug Level | Services\NAM\NAMDebugLevel |
| NAM Update Timestamp | Services\NAM\NAMConfigStatus |
| Administrative Port Value | Services\Administration\PortAddress |
| Administrative Update Timestamp | Services\Administration\AdminConfigStatus |

A node is an administrative node if the services\Administration\Global subkey exists. Known nodes can be determined by collecting all Services\Administration\Global\systemname\Nodes value entries. These are lists of nodes associated with particular TOP END™ systems 100.

Exemplary registry entries used by TOP END™ for Windows NT are listed described below. Registry subkeys and value entries should have leading capitals and should use mixed upper/lower case to make them readable rather than using "_" or some other punctuation. Standard registry value entries for TOP END™ are listed below and must be used when needed. As new registry value entries are created, consider establishing them as a standard if they will be applicable to other areas of TOP END™. Any Windows NT registry value entry standards should be used and listed below.

Lists of values assigned to an entry should have the values separated by semi-colons. Values assigned to entries may contain %variable% if variable is an environment variable available to the program(s) retrieving the registry value. These entries must be of type REG-EXPAND-SZ The normal subkey to the root of TOP END™ registry information is "\\HKEY_LOCAL_MACHINE\SOFTWARE\TOPEND". This is referred to as topendregistry within the documentation.

The presence of information in the registry does not mandate an interface to allow the customer to set it as they choose. The registry is a good place to store values established by TOP END™ Setup so that TOP END™ components 112 can easily retrieve the value.

The access control on TOP END™ registry subkeys and entries is as follows: The TOPEND_Group has full control to all subkeys and entries. The Administrators Group has full control to all subkeys and entries. The tpstem_Group has full control to Subkeys and entries associated with the specific TOP END™ system associated with this group. The topendregistry\Security subkey is an exception and is restricted to only the TOPEND Group.

The TOPENDDIR subkey value entry RootPath is the root of TOP END™ runtime files and the type is REG_SZ.

The TOPENDDIR subkey value entry SharedPath is the root of TOP END™ network shareable directory and the type is REG_SZ. The default value is UNC name of local computer's RootPath\Share directory.

The Security\Passwords\_topend subkey value entry Password is the Password for TOP END™ user account and the type is REG_SZ.

The Security\Passwords\systemname subkey value entry Password is the Password for this TOP END™ system account and the type is REG_SZ.

The Security\Systems\_topend subkey value entry Domain is the domain for TOP END™ user account and the type is REG_SZ.

The Security\Systems\_topend subkey value entry GroupId is the Group Name for TOP END™ user account and the type is REG_SZ.

The Security\Systems\_topend subkey value entry UserId is the User Name for TOP END™ user account and the type is REG_SZ.

The Security\Systems\systemname subkey value entry domain is the Domain for this TOP END™ system account and the type is REG_SZ.

The Security\Systems\systemname subkey value entry GroupId is the Group Name for this TOP END™ system account and the type is REG_SZ.

The Security\Systems\systemname subkey value entry UserId is the User Name for this TOP END™ system account and the type is REG_SZ.

The Services subkey is the root of all TOP END™ Windows NT Services registry entries.

The Services\IPCQ subkey is the Root of the IPCQ service registry information.

The Services\IPCQ subkey value entry IPCQConfigStatus is used as a flag which the setup application and configuration application can set when they have finished modifying one or more IPCQ Service registry parameter. The default value is timestamp and the type is REG_PIN. The setup application and the configuration application must store this value as a tp_ConfigStatus_t data structure.

The Services\IPCQ subkey value entry IPCQStartTime is set only by the IPCQ Service. The default value is 0 and the type is REG_DWORD. If this value is zero or more than five minutes ago, IPCQ Service will write the number of minutes since Windows NT started here and set the IPCQStartCount to zero. If this value is less than five minutes ago and IPCQStartCount is less than five, IPCQ Service will increment IPCQStartCount. If this value is less than five minutes ago and IPCQStartCount is not less than five, IPCQ Service will set IPCQStartTime and IPCQStartCount to zero and then exit.

The Services\IPCQ subkey value entry IPCQStartCount is the number of times IPCQ Service was started in any five minute time span. The default value is zero and the type is REG_DWORD.

The Services\IPCQ subkey value entry IPCQDebugLevel stores the debug level. This variable ranges from 0 (no debugging) to 8 (full debugging). The default value is 0 and the type is REG_DWORD.

The Services\IPCQ subkey value entry SysmonDebugLevel stores the Sysmon debug level. This variable ranges from 0 (no debugging) to 8 (full debugging). The default value is 0 and the type is REG_DWORD.

The Services\IPCQ subkey value entry threads is the number of worker threads. The range is 0, 1–32 where 0 means number of hardware processors. The default value is 0 and the type is REG_DWORD.

The Services\IPCQ subkey value entry NextQueueId is the Next queue id to assign. It is used on restart of the IPCQ service. The default value is 1 and the type is REG_DWORD.

The Services\IPCQ subkey value entry ReadMsgSize is the IPCQ buffer size for reading from IPCQ pipe is this value plus a fixed amount for headers. Messages larger than this will require multiple reads. A larger value than necessary ties up more IPCQ service local memory than necessary and could impact the number of connections the service can maintain. The range is 0, 512–32768, where 0 means that the IPCQ service should dynamically determine the value. The default value is 0 and the type is REG_DWORD.

The Services\IPCQ subkey value entry SpawnToGroup, when defined, will call LogonAsUser and CreateProcessAsUser if running under Win NT v3.51. Otherwise, it will call CreateProcess. The default value is 0 and the type is REG_DWORD.

The Services/NAM subkey is the root of Network Agent Manager service registry information.

The Services/NAM subkey value entry NAMConfigStatus is the date/time stamp used as an indicator for whether configuration changes occurred in any of the NAM Service's settings. The setup application and the configuration application must store this value as a tp_ConfigStatus_t data structure. The default value is timestamp and the type is REG_BIN.

The Services/NAM subkey value entry NAMStartTime is set only by NAM Service. The default value is 0 and the type is REG_DWORD. If this value is zero or more than five minutes ago, NAM Service will write the number of minutes since Windows NT started here and set the NAMStartCount to zero. If this value is less than five minutes ago and NAMStartCount is less than five, NAM Service will increment NAMStartCount. If this value is less than five minutes ago and NAMStartCount is not less than five, NAM Service will set IPCQStartTime and NAMStartCount to zero and then exit.

The Services/NAM subkey value entry NAMStartCount is the number of times NAM Service was started in any five minute time span. The default value is 0 and the type is REG_DWORD.

The Services/NAM subkey value entry NAMDebugLevel is a number between 0 and 8 specifying the debugging level. The default value is 0 and the type is REG_DWORD.

The Services\NAM\TCP/IP subkey value entry name is user definable. It is used as a string entry containing TOP END™ NA process command script followed by one or more service port names or port numbers. Each string token is separated by a semicolon. The setup application does not establish this default value. The configuration application will make this value available as a default. The default value is \%TOPENDDIR%\NA\NA. CMD;28001 and the type is REG_EXPAND_SZ or REG_SZ.

The Services\NAM\NamedPipes subkey Value Entry Name is user definable. It is used as a string entry containing TOP END™ NA process command script followed by one or more Named Pipe names. Each string token is separated by a semicolon. The setup application does not establish this default value. The configuration application will make this value available as a default. The default value is %TOPENDDIR%\NA\NA. CMD;TOPEND_NAM_PI PE and the type is REG_EXPAND_SZ or REG_SZ.

The Services\Administration subkey is the root to administrative services information.

The Services\Administration subkey value entry AdminConfigStatus is a date/time stamp used as an indicator for whether configuration changes occurred. The setup and configuration applications must store this value as a tp_ConfigStatus_t data structure. The type is REG_BIN.

The Serivces\Administration\tp_crsc subkey is the root of Global Admin Comm Agent service registry information.

The Services\Administration\tp_crsc subkey value entry StartTime is the Timestamp for last startup time. The type is REG_DWORD.

The Services\Administration\tp_crsc subkey value entry PortAddress is the name or number of service port used by listening tp_crsc services. The default value is global_admin and the type is REG_SZ.

The Services\Administration\tp_gcomm subkey is the root of Global Admin Comm Manager service registry information.

The Services\Administration\tp_gcomm subkey value entry StartTime is the Timestamp for last startup time. The type is REG_DWORD.

The Services\Administration\Global\systemname subkey value entry nodes is a multi-string string. Each substring in the value is separated by a null character with the value being terminated by adjacent null characters. The default value is null and the type is REG_MULTI_SZ.

The Services\Administration\Global\systemname subkey value entry Administrators is a multi-string string. Each substring in the value is separated by a null character with the value being terminated by adjacent null characters. Topend_user should always be in this list. The default value is none and the type is REG_MULTI_SZ.

The install subkey is the root of TOP END™ installation information.

The Install\Base\Runtime subkey value entry VersionNumber contains the release version number when the software is installed. The value is NULL if the software is not installed.

The Install\Base\Development subkey value entry VersionNumber contains the release version number when the software is installed. The value is NULL if not installed and the type is REG_SZ.

The Install\Base\Help subkey value entry VersionNumber contains the release version number when the software is installed. The value is NULL if not installed and the type is REG_SZ.

The Install\Base\RemoteAdmin subkey value entry VersionNumber contains the release version number when the software is installed. The value is NULL if not installed and the type is REG_SZ.

The Install\GA\Runtime subkey value entry VersionNumber contains the release version number when the software is installed. The value is NULL if not installed and the type is REG_SZ.

The Install\GA\RemoteAdmin subkey value entry VersionNumber contains the release version number when the software is installed. The value is NULL if not installed and the type is REG_SZ.

The Install\GA\Help subkey value entry VersionNumber contains the release version number when the software is installed. The value is NULL if not installed and the type is REG_SZ.

The Install\RTQ\Runtime subkey value entry VersionNumber contains the release version number when the software is installed. The value is NULL if not installed and the type is REG_SZ.

The Install\RTQ\Development subkey value entry VersionNumber contains the release version number when the software is installed. The value is NULL if not installed and the type is REG_SZ.

The Install\RTQ\Help subkey value entry VersionNumber contains the release version number when the software is installed. The value is NULL if not installed and the type is REG_SZ.

The tpgen subkey is the root of Root of tpgen information.

The tpgen subkey value entry AdminNodes is a NULL separated list of Administration Nodes for tpgen to update their registry with system information after a successful generation. The default value is Local Computer Name and the type is REG_MULTI_SZ.

The tpgen subkey value entry LastSystem is the last system name selected for generation by tpgen. This is used as the default for the next generation. The default value is NULL and the type is REG_SZ.

The tpgen subkey value entry NextPackage is the next package number for tpgen to use when generating TOP END™ system packages teNNNNN. The default value is 0 and the type is REG_DWORD.

The tpgen subkey value entry Package Directory is the default location for tpgen to create the package source directory named teNNNNN. If the location is changed in tpgen, the new location becomes the default for the next time. The default value is \%TOPENDDIR%\isd\pkgs rc and the type is REG_SZ.

Conclusion

In summary, the present invention discloses a method, apparatus, and article of manufacture for systems administration for a computer network. The present invention provides a configuration application that performs the steps of receiving a service process selection, receiving a service process configuration change, receiving a target node selection, wherein the service process runs on target nodes, and applying the configuration change to the service process. The target node entries and the service process entries in the network registry are updated. In the preferred embodiment, the service process can be an interprocess communications queue (IPCQ) service, a network agent manager service, or an administration service.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for administering a computer network of interconnected nodes, comprising the steps of:
   (a) displaying a configuration utility on a monitor attached to a computer connected to the network, wherein the displayed configuration utility includes a list of one or more target nodes in the network;
   (b) receiving data into the displayed configuration utility for selecting one or more of the target nodes in the network and for specifying one or more configurable elements on the selected target nodes; and
   (c) modifying the specified configurable elements on the selected target nodes in accordance with the received data.

2. The method of claim 1 above, wherein the displaying step further comprises the step of constructing the list of target nodes in the displayed configuration utility.

3. The method of claim 2 above, wherein the modifying step further comprises the step of modifying the configurable elements on the constructed list of target nodes in the displayed configuration utility in accordance with the received data.

4. The method of claim 1 above, wherein the selected target nodes comprise one or more nodes selected from a group comprising local nodes and remote nodes.

5. The method of claim 1 above, wherein the configurable elements comprise registry structures and the modifying step further comprises the step of modifying the registry structures on the selected target nodes.

6. The method of claim 5 above, wherein the registry structures store configuration information for an operating system on the selected target nodes.

7. The method of claim 6 above, wherein the configuration information is selected from a group comprising equipment settings, software configurations, and network setup.

8. The method of claim 1 above, wherein the configurable elements relate to one or more services installed and executed on the selected target nodes.

9. The method of claim 8 above, wherein the services are represented graphically in the displayed configuration utility.

10. The method of claim 8 above, wherein the displaying step further comprises the step of displaying a dialog for each of the services, wherein the dialog identifies the configurable elements for the service.

11. The method of claim 10 above, further comprising the step of identifying a template node for initializing the displayed dialog with desired values for the configurable elements for the service.

12. An apparatus for administering a computer network of interconnected nodes, comprising:
   (a) a computer with a monitor attached thereto, wherein the computer is connected to the network;
   (b) means, performed by the computer, for displaying a configuration utility on the monitor, wherein the displayed configuration utility includes a list of one or more target nodes in the network;

(c) means, performed by the computer, for receiving data into the displayed configuration utility for selecting one or more of the target nodes in the network and for specifying one or more configurable elements on the selected target nodes; and (d) means, performed by the computer, for modifying the specified configurable elements on the selected target nodes in accordance with the received data.

13. The apparatus of claim 12 above, wherein the displayed configuration utility comprises a graphical user interface (GUI).

14. The apparatus of claim 12 above, wherein the means for displaying further comprises means for constructing the list of target nodes in the displayed configuration utility.

15. The apparatus of claim 14 above, wherein the means for modifying further comprises means for modifying the configurable elements on the constructed list of target nodes in the displayed configuration utility in accordance with the received data.

16. The apparatus of claim 12 above, wherein the selected target nodes comprise one or more nodes selected from a group comprising local nodes and remote nodes.

17. The apparatus of claim 12 above, wherein the configurable elements comprise registry structures and the means for modifying further comprises means for modifying the registry structures on the selected target nodes.

18. The apparatus of claim 17 above, wherein the registry structures store configuration information for an operating system on the selected target nodes.

19. The apparatus of claim 18 above, wherein the configuration information is selected from a group comprising equipment settings, software configurations, and network setup.

20. The apparatus of claim 12 above, wherein the configurable elements relate to one or more services installed and executed on the selected target nodes.

21. The apparatus of claim 20 above, wherein the services are represented graphically in the displayed configuration utility.

22. The apparatus of claim 20 above, wherein the means for displaying further comprises means for displaying a dialog for each of the services, wherein the dialog identifies the configurable elements for the service.

23. The apparatus of claim 22 above, further comprising means for identifying a template node for initializing the displayed dialog with desired values for the configurable elements for the service.

24. An article of manufacture embodying one or more instructions executable by a computer connected to a network of interconnected nodes to perform method steps for administering the computer network of interconnected nodes, the method comprising the steps of:

(a) displaying a configuration utility on a monitor attached to the computer, wherein the displayed configuration utility includes a list of one or more target nodes in the network;

(b) receiving data into the displayed configuration utility for selecting one or more of the target nodes in the network and for specifying one or more configurable elements on the selected target nodes; and (c) modifying the specified configurable elements on the selected target nodes in accordance with the received data.

25. The method of claim 24 above, wherein the displayed configuration utility comprises a graphical user interface (GUI).

26. The method of claim 24 above, wherein the displaying step further comprises the step of constructing the list of target nodes in the displayed configuration utility.

27. The method of claim 26 above, wherein the modifying step further comprises the step of modifying the configurable elements on the constructed list of target nodes in the displayed configuration utility in accordance with the received data.

28. The method of claim 24 above, wherein the selected target nodes comprise one or more nodes selected from a group comprising local nodes and remote nodes.

29. The method of claim 24 above, wherein the configurable elements comprise registry structures and the modifying step further comprises the step of modifying the registry structures on the selected target nodes.

30. The method of claim 29 above, wherein the registry structures store configuration information for an operating system on the selected target nodes.

31. The method of claim 30 above, wherein the configuration information is selected from a group comprising equipment settings, software configurations, and network setup.

32. The method of claim 24 above, wherein the configurable elements relate to one or more services installed and executed on the selected target nodes.

33. The method of claim 32 above, wherein the services are represented graphically in the displayed configuration utility.

34. The method of claim 32 above, wherein the displaying step further comprises the step of displaying a dialog for each of the services, wherein the dialog identifies the configurable elements for the service.

35. The method of claim 34 above, further comprising the step of identifying a template node for initializing the displayed dialog with desired values for the configurable elements for the service.

36. The method of claim 1 above, wherein the displayed configuration utility comprises a graphical user interface (GUI).

* * * * *